(12) United States Patent
Browne et al.

(10) Patent No.: US 6,798,096 B2
(45) Date of Patent: Sep. 28, 2004

(54) THERMAL BARRIER AND COOLING AIR DEFLECTOR FOR TOTALLY ENCLOSED MOTOR

(75) Inventors: Stephen Douglas Browne, Shelby, NC (US); Stephen T. Evon, Easley, SC (US); William L. Subler, Moore, SC (US); Jack Byron Whitley, Huntersville, NC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 10/758,744

(22) Filed: Jan. 16, 2004

(65) Prior Publication Data

US 2004/0145253 A1 Jul. 29, 2004

Related U.S. Application Data

(63) Continuation of application No. 09/878,527, filed on Jun. 11, 2001, now Pat. No. 6,734,584.

(51) Int. Cl.[7] ............................................. H02K 9/04
(52) U.S. Cl. ........................... 310/58; 310/90; 310/52; 310/85
(58) Field of Search ............................. 310/58, 52, 51, 310/59, 60 A, 63, 85, 90

(56) References Cited

U.S. PATENT DOCUMENTS

| | | | | |
|---|---|---|---|---|
| 3,862,443 A | * | 1/1975 | Edick | 310/90 |
| 4,418,295 A | * | 11/1983 | Shiga | 310/59 |
| 4,948,946 A | * | 8/1990 | Fukunaga | 219/230 |
| 5,731,644 A | * | 3/1998 | Drlik | 310/58 |

* cited by examiner

Primary Examiner—Tran Nguyen
Assistant Examiner—J. Aguirrechea
(74) Attorney, Agent, or Firm—Amin & Turocy, LLP; Alexander M. Gerasimow

(57) ABSTRACT

The present invention provides for a system and method for facilitating cooling of a totally enclosed motor. A first thermal barrier is coupled to a first end bracket and is operable to insulate bearings from internal heat produced by the motor. Either an external fan located opposite the drive end of the motor, an externally mounted blower, or free ambient air convection may be employed to provide cooling air to the motor. An air deflector is coupled to the drive end of the motor to capture the cooling air and direct it as high velocity air over the first end bracket thereby keeping the bearings supported within the first end bracket cool. Alternatively, an external fan may be coupled to the drive end of the motor to provide cooling air to the first end bracket.

20 Claims, 8 Drawing Sheets

THERMAL BARRIER AND COOLING AIR DEFLECTOR FOR TOTALLY ENCLOSED MOTOR

CROSS-REFERENCE TO RELATED APPLICATIONS

This application is a continuation of U.S. patent application Ser. No. 09/878,527 entitled "THERMAL BARRIER AND COOLING AIR DEFLECTOR FOR TOTALLY ENCLOSED MOTOR" and filed Jun. 11, 2001, now U.S. Pat. No. 6,734,584 the entirety of which is incorporated by reference.

TECHNICAL FIELD

The present invention generally relates to totally enclosed motors and in particular to a system and method of facilitating cooling of internal components of a totally enclosed motor.

BACKGROUND OF THE INVENTION

Electric motors generate heat during operation as a result of both electrical and mechanical losses, and an electric motor typically must be cooled in order to ensure the desired and efficient operation of the motor. An excessively high motor temperature may result in motor bearing failure or damage to the stator winding insulation. Electric motors generally have an enclosure, or housing, including a frame and end brackets. Some of the most common enclosures include open enclosures and totally enclosed enclosures. With an open enclosure, ambient air circulates within the enclosure, and heat is removed by convection between the air and heat generating motor components within the enclosure. The heated air is exhausted out from the enclosure.

Totally enclosed type enclosures typically are used in applications in which airborne contaminants (e.g., dirt, oil, or mist), must be prevented from entering within the enclosure. There is no communication of air through the enclosure and thus no possibility of bringing cooling air from outside the enclosure into the interior. Both convection and conduction type cooling occurs within the enclosure, and some form of convection cooling occurs at the external surfaces of the enclosure. For example, a fan mounted to the motor shaft provides forced convection cooling. The fan forces air over the frame and end brackets. However, this system can be unsatisfactory to cool the bearings. The heating of the bearing is primarily the result of the air inside the motor that is elevated in temperature by the heat generated by the rotor and stator windings and friction losses in the bearing.

The prior art has attempted to cool bearings in totally enclosed motors by cooling an outside surface thermally coupled to the bearing by an external shaft fan. The arrangement was unsatisfactory since the external fan was noisy, reduced motor efficiency and was often covered by a customer coupling guard. The prior art has attempted to circulate the air internal the motor. This was also unsatisfactory since there was little transfer of heat from the inside of the motor to an outside ambient. Circulation of the internal air, which is elevated in temperature, is totally inadequate to cool the bearing. Other methods attempted by the prior art include enlarging the case for more cooling surface area, rating the motors for a lower power rating for a given fan RPM.

Therefore, there is an unmet need in the art to provide improvements in cooling of the bearings of totally enclosed motors for maintaining the reliability of the motor during normal operations.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for a system and method that facilitates cooling of the bearings of a totally enclosed motor. The totally enclosed motor of the present invention includes a cylindrical frame coupled to a first circular end bracket and a second circular end bracket. The first end bracket is located at a drive end of the motor while the second end bracket is located opposite the drive end of the motor. Within the frame is an electrical core for providing energy to the motor. The electrical core consists of a stator, a rotor, and any additional circuitry and wiring required to operate the motor. The rotor is mounted on a rotor shaft. The rotor shaft assembly is supported by bearing assemblies located in both the first end bracket and second end bracket. The stator and rotor produces heat while providing energy to the motor. The present invention provides for a system and method of providing cooling air in addition to isolating at least one of the bearings to improve bearing life.

According to one aspect of the present invention, an improved cooling system for a totally enclosed motor includes a first thermal barrier coupled to the first end bracket and operable to insulate the bearing located at the drive end of the motor. Either an external fan located opposite the drive end of the motor or an externally mounted blower may be employed to provide cooling air to the motor. Moreover, a second thermal barrier operable to insulate bearings located opposite the drive end of the motor may be coupled to the second end bracket.

According to another aspect of the present invention, an improved cooling system for a totally enclosed motor includes an air deflector coupled to the drive end of the motor. The air deflector is operable to capture the cooling air provided by the external fan or the blower and direct it as high velocity air over the first end bracket, thereby keeping the bearing supported within the first end bracket cool. Alternatively, an external fan may be coupled to the drive end of the motor to provide cooling air to the first end bracket.

To the accomplishment of the foregoing and related ends, the invention then, comprises the features hereinafter fully described and particularly pointed out in the claims. The following description and annexed drawings set forth in detail certain illustrative embodiments of the invention. These embodiments are indicative, however, of but a few of the various ways in which the principles of the invention may be employed. Other object, advantages and novel features of the invention will become apparent from the following detailed description of the invention when considered in conjunction with the drawings.

DETAILED DESCRIPTION OF THE INVENTION

The present invention will now be described with reference to the drawings. The present invention provides for a system and method that facilitates cooling of the bearings of a totally enclosed motor. The totally enclosed motor can be provided with a fan at an opposite drive end of the motor for cooling the motor. Alternatively, a blower may be provided at the opposite drive end of the motor for cooling the motor. The totally enclosed motor may also be cooled by convection as a non-ventilated motor. The present invention will also be described with reference to a methodology for employing the system.

Figure 1:
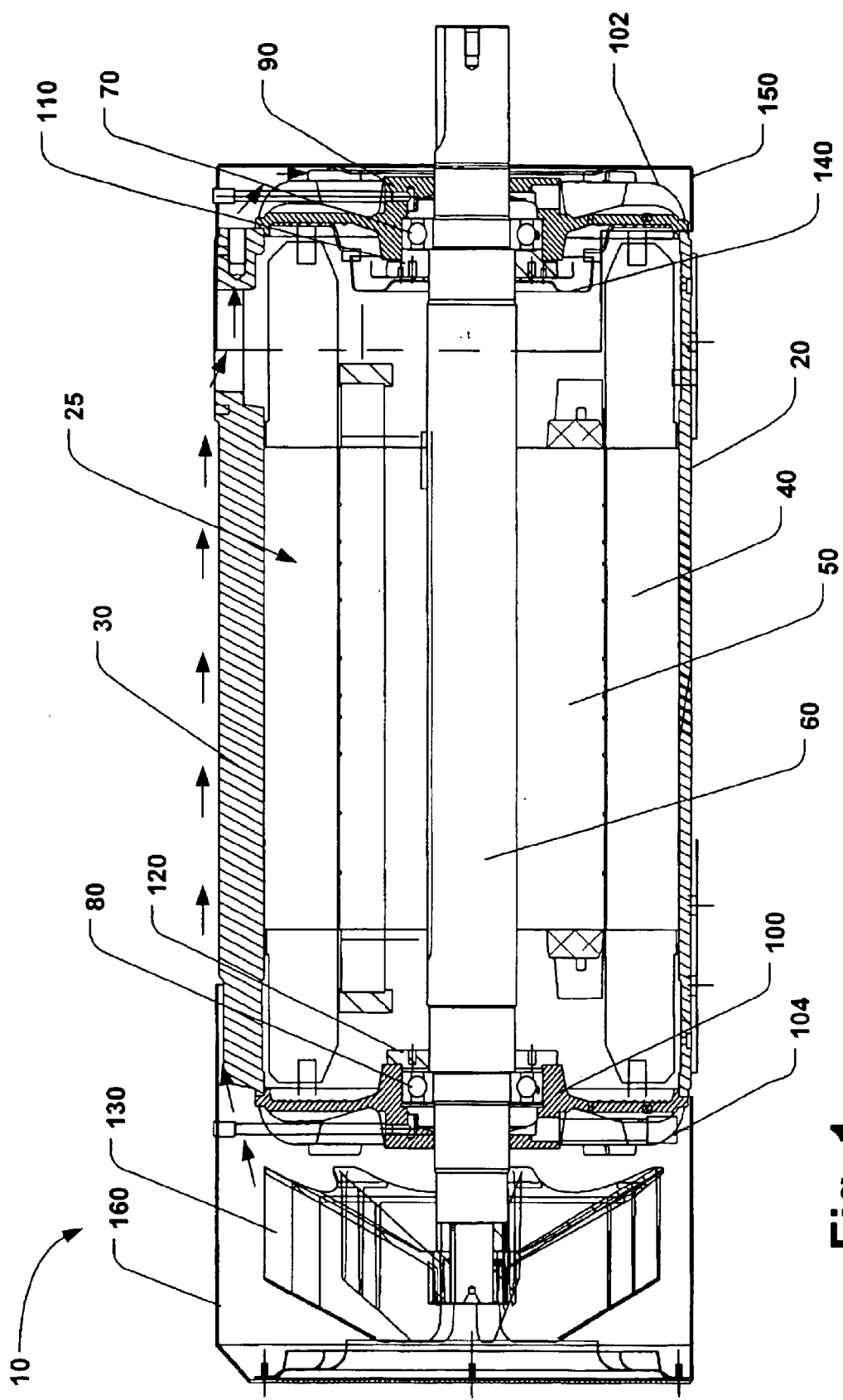
FIG. 1 illustrates a cross-sectional view of a totally enclosed fan cooled motor in accordance with one aspect of the present invention.

FIG. 1 illustrates an example of a system for facilitating cooling of internal components of a totally enclosed fan cooled (TEFC) motor in accordance with one aspect of the present invention. A TEFC motor 10 has a generally cylindrical frame 20 surrounding a motor core 25. The motor core 25 converts electrical energy to mechanical energy to drive external devices coupled to the motor 10. The motor core 25 is comprised of a stator 40 and a rotor 50. The rotor 50 is coupled to a shaft 60 extending through a central longitudinal axis of the motor 10. During operation of the motor 10, electrical current is provided to the stator windings, which generates a magnetic field that induces a current in the windings of the rotor. The induced current in the windings also generates a magnetic field that follows the rotating magnetic field generated from the windings of the stator and causes the rotor 50 to rotate, thus, rotating the shaft 60. During operation of the motor 10, heat is generated from the windings of both the stator 60 and the rotor 50 within the motor core 25. The shaft 60 is supported by a first bearing assembly 70 located at a drive end of the motor 10 and a second bearing assembly 80 located at an opposite end of the drive end of the motor 10. The heat generated from the core 25 of the motor 10 heats the air inside the motor 10. The heated air has a deleterious effect on the efficient operation and life of the bearing assemblies 70 and 80. Additionally, the heat generated by the core 25 has a deleterious effect on the efficiency of the motor 10.

The frame 20 is formed from cast iron or the like and can be molded as a single integral piece or assembled as multiple pieces. The frame 20 includes a plurality of radial extending fins 30 substantially covering the frame 20. The bearing assemblies 70 and 80 are generally supported by circular end brackets 90 and 100, generally referred to as end bells or end shields. The circular end brackets may also include axially extending fins 102 and 104 similar to the motor fins 30. The circular end brackets 90 and 100 and cylindrical frame 20 totally enclose the stator 40 and rotor 50. The fins 30, 102 and 104 add surface area and direct air over the frame 20 to provide cooling to the motor core 25 and the bearing assemblies 70 and 80. Inner caps 110 and 120 are coupled to an inner surface of the end brackets 90 and 100, respectively, and are employed to secure the bearings 70 and 80 in place.

One end of the shaft 60 supports an external fan 130. The fan is surrounded by an enclosure 160 mounted to the opposite drive end of the motor 10. The fan 130 is employed to provide cooling air over the motor 10. The cooling air flows over an outside surface of the circular end bracket 100 providing cooling to the bearing assembly 80. The cooling air also flows over the motor fins 30 in the direction of the arrows along an outer surface of the frame 20 and around the motor fins 30. Some of the cooling air is captured by an air deflector 150 coupled to the drive end of the TEFC motor 10, so that the air can be channeled to cool an outside surface of the circular end bracket 90 through end bracket fins 102, as well as the bearings 70 enclosed within the end bracket 90.

Since the fan 130 is present at the opposite drive end of the motor 10, the motor 10 experiences a temperature gradient from one end to the other end, such that the cooling at the drive end is less than at the opposite drive end. Therefore, it is common in the art to mount an external fan (not shown) to the drive end of the motor to keep the temperature gradient at a minimum. However, with this external fan system, a temperature gradient between the two ends of the motor still exists. This inability to sufficiently cool the drive end bearings 70 may limit the rating of the motor.

Thus, in accordance with one aspect of the present invention, the TEFC motor 10 also includes a thermal barrier 140 for insulating the bearing assembly 70 from the heat generated by the motor core 25. The thermal barrier 140 is mounted to an inside surface of the inner cap 110 and the end bracket 90. The thermal barrier 140 is adapted to cover a substantial portion of the inner cap 100 and the end bracket 90 that is exposed to the internal air of the motor 10. Since the bearings 70 are encased within the inner cap 110 and the end bracket 90, the thermal barrier 140 acts to insulate the bearings 70 from the heated internal air of the motor 10. This provides for a reduced operating temperature and increased life of the bearings 70. Alternatively, a thermal barrier may be coupled to any other part of the motor 10, such as the motor frame 20, as long as it acts to insulate the bearings 70 from the heat produced by the electrical core 25.

Figure 3:
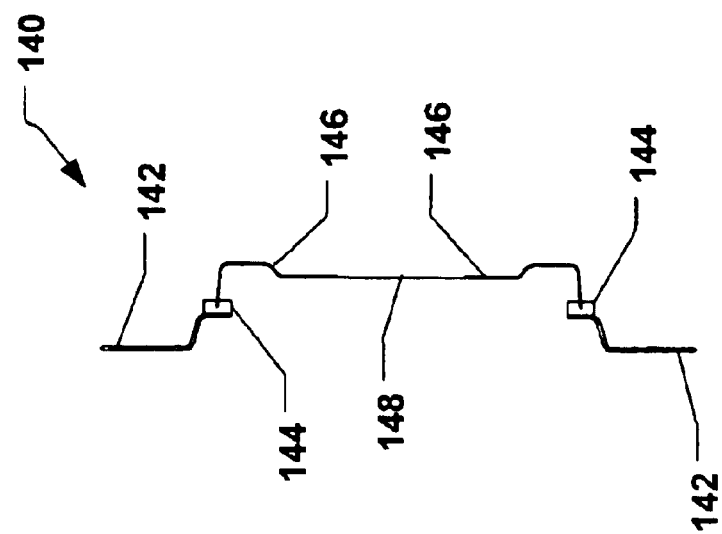
FIG. 3 illustrates a cross-sectional view of the thermal barrier of FIG. 2 along the lines A—A in accordance with one aspect of the present invention.
Figure 2:
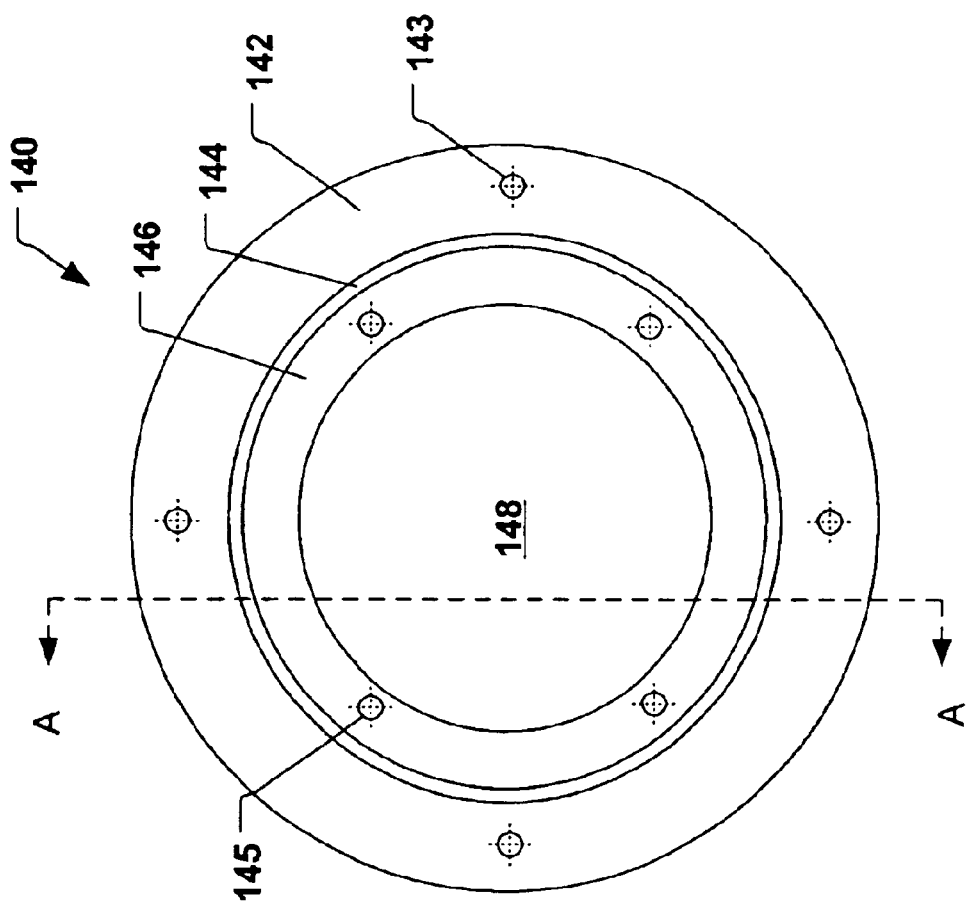
FIG. 2 illustrates a front view of a thermal barrier in accordance with one aspect of the present invention.

FIGS. 2–3 illustrate a thermal barrier 140 in accordance with one aspect of the present invention. FIG. 2 illustrates a front view of the thermal barrier 140, while FIG. 3 illustrates a cross-sectional view of the thermal barrier 140 along the lines A—A. The thermal barrier 140 comprises three parts: an annular inner cap thermal barrier 146; an annular end bracket thermal barrier 142; and an annular gasket 144. The inner cap thermal barrier 146 includes a circular central opening 148, so that the shaft 60 can extend through the thermal barrier 140. The inner cap thermal barrier 146 and the end bracket thermal barrier 142 are adapted to insulate the inner cap 110 and the end bracket 90 from the internal air of the motor 10, so that heat is kept off the bearings 70. The inner cap thermal barrier 146 includes apertures 145 for mounting the inner cap thermal barrier 146 to the inner cap 110. The end bracket thermal barrier 142 includes apertures 143 for mounting the end bracket thermal barrier 142 to the inner surface of the end bracket 90. The inner cap thermal barrier 146 and the end bracket thermal barrier 142 may be made of any material (e.g., fiberglass, metal) suitable to withstand the heat of the motor and provide a sufficient thermal barrier between the internal air of the motor and the inner cap 110 and end bracket 90.

For example, in some applications space heaters are mounted to the inner caps 110 and 120 to prevent condensation from forming when the motor is not energized. In this application, metal is preferred to fiberglass due to its ability to withstand higher temperatures than fiberglass. It is to be appreciated that the choice of material may differ according to the particular industrial application of the motor. Although the thermal barrier is illustrated as being formed of two or more separate parts, it is to be appreciated that the thermal barrier may be manufactured as a single integral part.

The gasket 144 is utilized to create an airtight seal between the inner cap thermal barrier 146 and the end bracket thermal barrier 142 mating parts. This airtight seal is important to keep the internal air of the motor 10 off the bearings 70 and/or end bracket 90. The gasket 144 is also operable to account for variations in tolerance present in the inner cap thermal barrier 146 and the end bracket thermal barrier 142. The gasket 144 may be of any suitable material able to withstand the heat generated by the motor 10 and provide a seal between the mating parts of the thermal barrier 140. Examples of such material include a polymeric resin that can withstand the heat generated by the core 25 of the motor 10, such as vinyl-ester resin or VITON® developed by DuPont.

The gasket 144 is mounted to the inner cap thermal barrier 146 and the end bracket thermal barrier 142 by employing an epoxy such as a epichlorohydrin material rated to withstand the heat generated by the motor core 25. The gasket 144 is mounted to the inner cap thermal barrier 146 and the end bracket thermal barrier 142 after the inner cap thermal barrier 146 and the end bracket thermal barrier 142 are mounted to the inner cap 10 and the end bracket 90, so that the gasket can compensate for any tolerance variations in the inner cap 110 and the end bracket 90. However, if a thermal barrier is employed as a single piece or the mating parts are sufficient to create an airtight barrier between the bearings 70 and the internal air of the motor 10, the gasket 144 will not be necessary.

Figure 5:
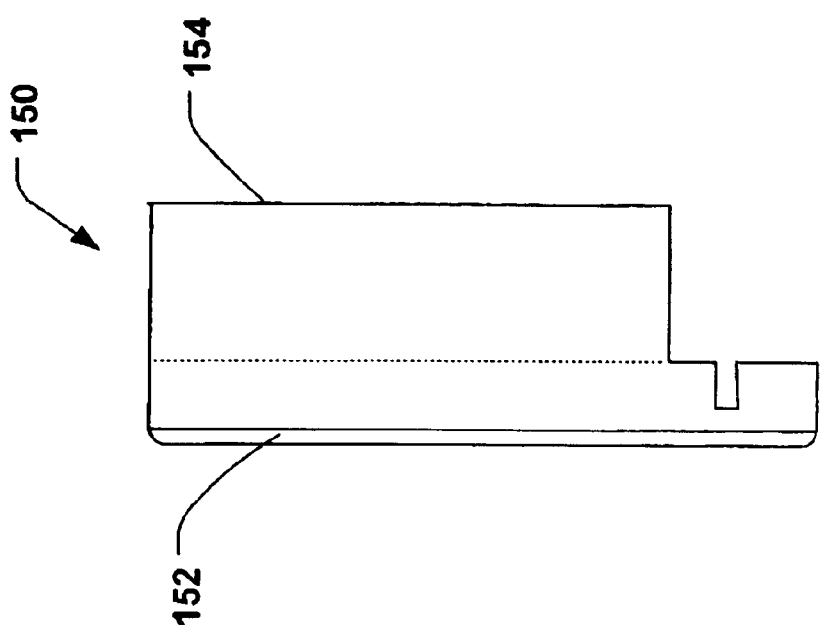
FIG. 5 illustrates a side view of the air deflector of FIG. 4 in accordance with one aspect of the present invention.
Figure 4:
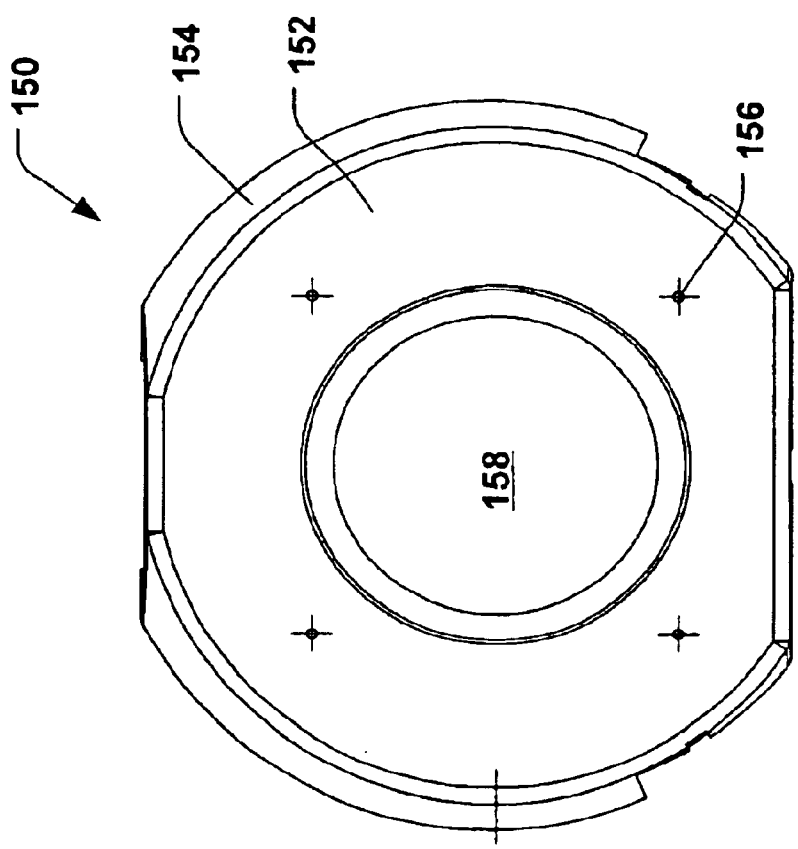
FIG. 4 illustrates a front view of an air deflector in accordance with one aspect of the present invention.

FIGS. 4 and 5 illustrate an air deflector 150 in accordance with one aspect of the present invention. FIG. 4 illustrates a front view of the air deflector 150, while FIG. 5 illustrates a side view of the air deflector. The air deflector 150 is adapted to be secured to the drive end of the motor. In the present invention, the air deflector 150 is shown as one piece that substantially covers the drive end of the motor 10. The air deflector 150 is formed of an annular flat portion 152 and an outwardly extending semicircular portion 154. The annular flat portion 152 is adapted to mount to and cover the drive end of the motor 10 (e.g., the end bracket 90). The outwardly extending semicircular portion 154 is adapted to extend along the outer circumference of the frame 20, so that cool air from the fan can be channeled to the outside surface of the end bracket 90. The air deflector 150 includes a circular central opening 158, so that the shaft 60 can extend through the air deflector 150. The air deflector 150 includes apertures 156 for mounting the air deflector 150 to the drive end of the motor 150.

Materials used to manufacture the air deflector 150 may include fiberglass, cast-iron or sheet metal depending upon the environment that the motor 10 will be employed. However, the air deflector 150 may be manufactured from any other material able to withstand various customer industries and applications. Furthermore, although the air deflector 150, as described, is generally one complete part, it may be two or more parts and still be contemplated as falling within the scope of the present invention.

Figure 6:
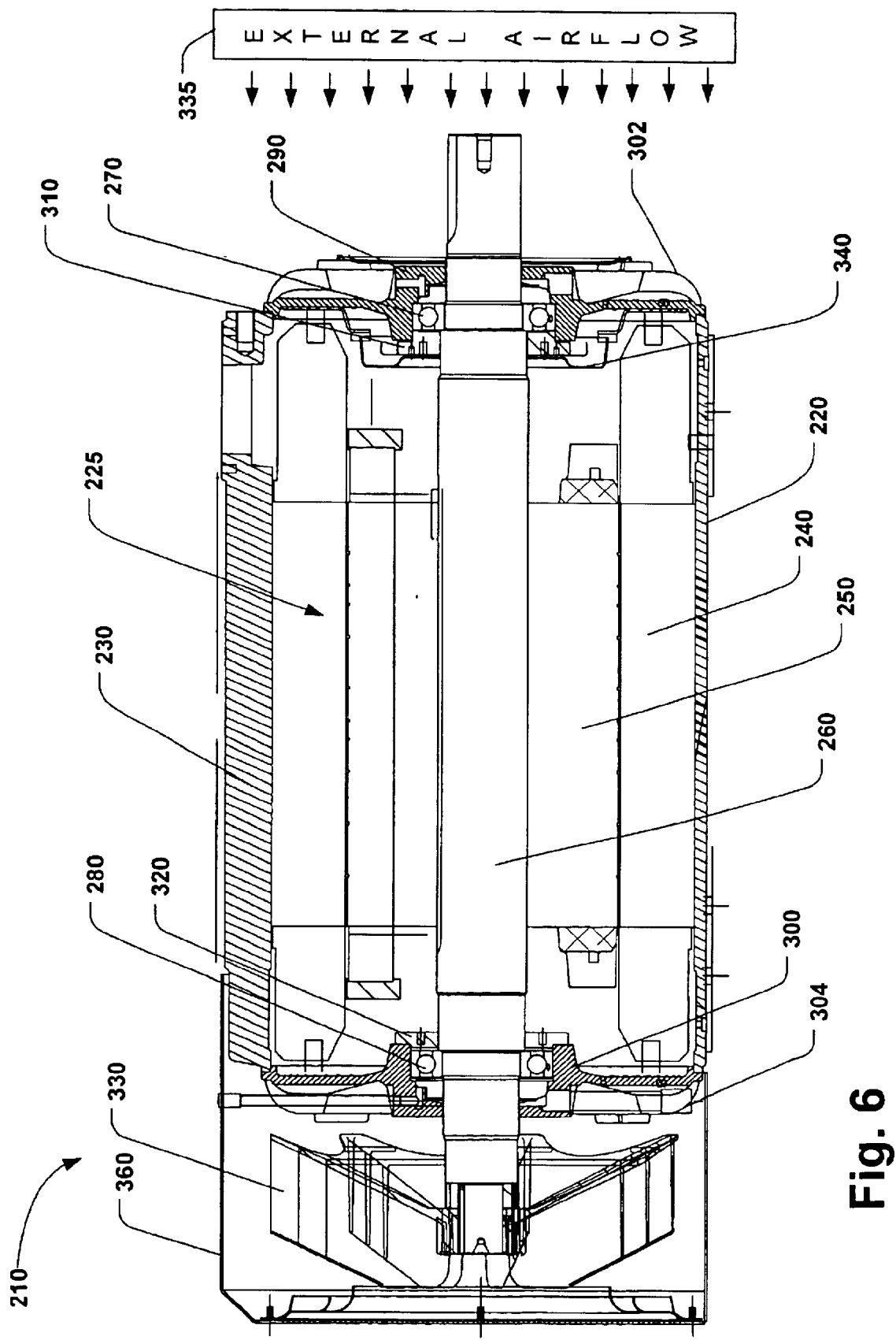
FIG. 6 illustrates a cross-sectional view of a totally enclosed fan cooled motor utilizing an external airflow source in accordance with one aspect of the present invention.

FIG. 6 illustrates another aspect of the present invention. A system for improved cooling of a TEFC motor 210 includes a thermal barrier 340 disposed inside the motor 210 for insulating a drive side bearing assembly 270 from the heat generated by a motor core 225. The TEFC motor 210 has a generally cylindrical frame 220 surrounding the motor core 225. The motor core 225 is comprised of a stator 240 and a rotor 250. The rotor 250 is coupled to a shaft 260 extending through a central longitudinal axis of the motor 210. The shaft 260 is supported by the bearing assembly 270 located at a drive end of the motor 210 and a bearing assembly 280 located at opposite end of the drive end of the motor 210. The frame 220 includes a plurality of radial extending fins 230 substantially covering the frame 220. The bearing assemblies 270 and 280 are generally supported by circular end brackets 290 and 300, and inner caps 310 and 320 coupled to the end brackets 290 and 300, respectively. The circular end brackets 310 and 320 also include axially extending fins 302 and 304 similar to the motor fins 230. One end of the shaft 260 supports an external fan 330. The external fan 330 is surrounded by an enclosure 360 disposed at an opposite drive end of the motor 210. The fan 330 is employed to provide cooling air to the motor 210.

The thermal barrier 340 is mounted to the inner cap 310 and adapted to cover a substantial portion of the inner cap 310 and the end bracket 290 that is exposed to the internal air of the motor 210. Since the bearings 270 are encased within the inner cap 310 and the end bracket 290, the thermal barrier 340 acts to insulate the bearings 270 from the heated internal air of the motor 210. This provides for a reduced operating temperature and increased life of the bearings 270. The system does not employ an air deflector like the system of FIG. 1, but utilizes an external air source 335 for cooling the drive end of the motor. The external air source 335 can be an external shaft mounted fan or an external blower. Alternatively, the drive end of the motor can be cooled by convection, such that the external air source 335 is air from the environment surrounding the motor 210.

Figure 7:
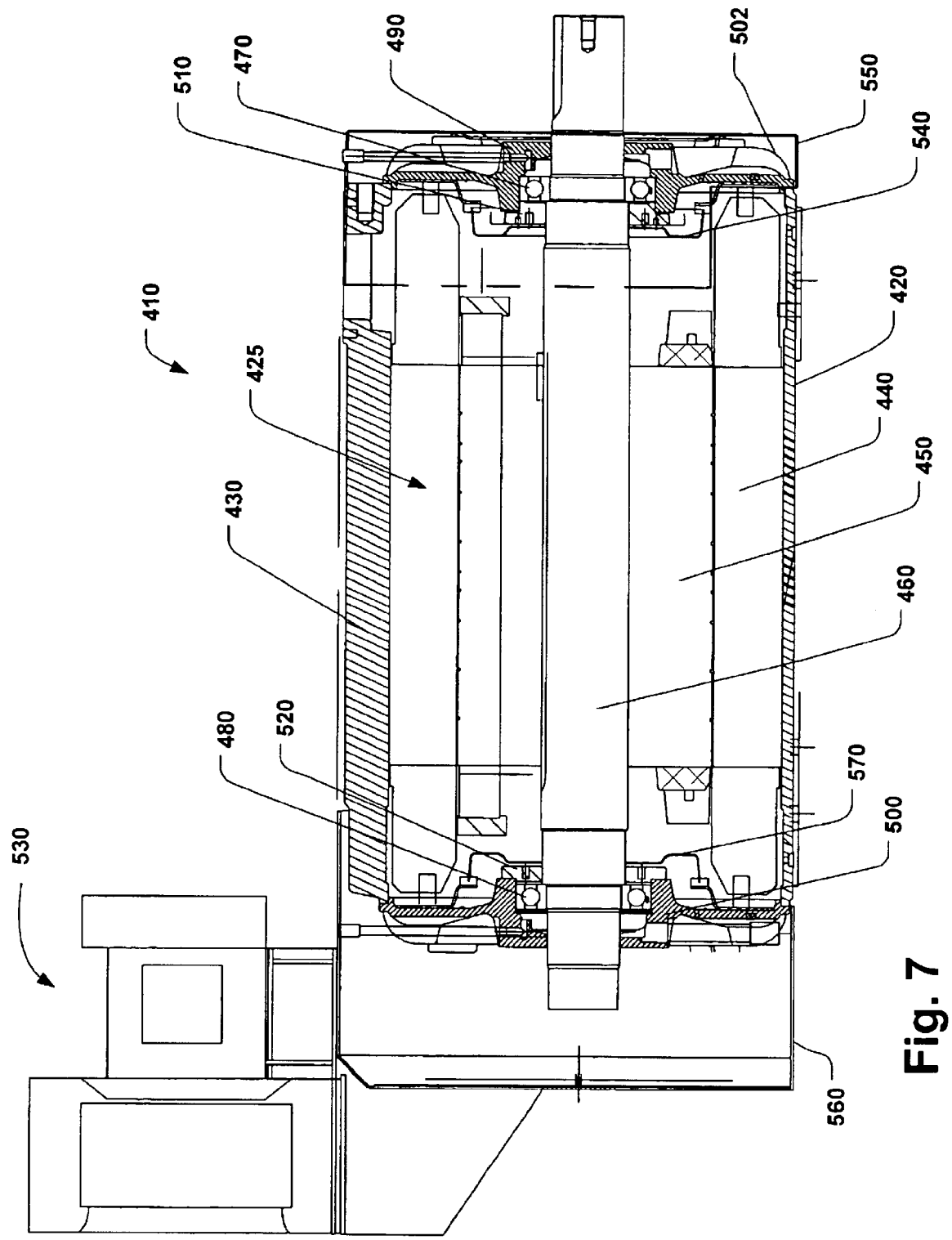
FIG. 7 illustrates a cross-sectional view of a totally enclosed motor utilizing in accordance with one aspect of the present invention.

FIG. 7 illustrates yet another aspect of the present invention. When an external fan is present in a totally enclosed motor, it is generally coupled to the rotor shaft, as described in FIG. 1 and FIG. 6. Thus, the speed of the fan is dependent on the speed of the motor. In variable speed motors, the motor does not cool as well utilizing an external fan due to the constant changes in speed. For instance, when the speed of the fan decreases in response to a decrease in motor speed, the cooling effect of the fan decreases. In order to provide cooling air to the motor at variable speeds, a blower 530 may be employed in lieu of the fan. The fan may or may not be present in the motor.

FIG. 7 illustrates a system for facilitating cooling of a totally enclosed motor 410. The totally enclosed motor 410 has a generally cylindrical frame 420 surrounding a motor core 425. The motor core 425 is comprised of a stator 440 and a rotor 450. The rotor 450 is coupled to a shaft 460 extending through a central longitudinal axis of the motor 410. The shaft 460 is supported by a bearing assembly 470 located at a drive end of the motor 410 and a bearing assembly 480 located at opposite end of the drive end of the motor 410. The frame 420 includes a plurality of radial extending fins 430 substantially covering the frame 420. The bearing assemblies 470 and 480 are generally supported by circular end brackets 490 and 500, and inner caps 510 and 520 coupled to the end brackets 490 and 500, respectively. The circular end brackets 490 and 500 may include axially extending fins 502 and 504 similar to the motor fins 530.

The motor 410 includes a thermal barrier 540 disposed inside the motor 410 for insulating the drive side bearing assembly 470 from the heat generated by the motor core 425. The thermal barrier 540 is mounted to the inner cap 510 and is adapted to cover a substantial portion of the inner cap 510 and the end bracket 490 that are exposed to the internal air of the motor 410. Since the bearings 470 are encased within the inner cap 510 and the end bracket 490, the thermal barrier 540 acts to insulate the bearings 470 from the heated internal air of the motor 410. The motor 410 can also include a thermal barrier 570 disposed inside the motor 410 for insulating a non-drive side bearing assembly 480 from the heat generated by the motor core 425. The thermal barrier 570 is provided to ensure that the opposite drive side of the motor 410 remains cool in absence of a fan for providing cooling directly to the opposite drive side of the motor 410. The thermal barrier 570 is mounted to the inner cap 520 and is adapted to cover a substantial portion of the inner cap 520 and the end bracket 500 that is exposed to the internal air of the motor 410. Since the bearings 480 are encased within the inner cap 520 and the end bracket 500, the thermal barrier 570 acts to insulate the bearings 480 from the heated internal air of the motor 410.

The blower 530 provides airflow down the frame 420 of the motor 410 to an air deflector 550. The blower 530 is attached to an enclosure 560 located at the opposite drive end of the motor 410. It is to be appreciated that the blower 530 may be attached to some other structure besides the motor 410. The blower 530 provides cool air along the external frame 420 at a constant velocity regardless of the operating speed of the motor 410. Cooled air from the blower 530 flows through channels formed by the fins 430 over the external frame 420 of the motor 410. The air deflector 550 captures a portion of the external cooled air and directs it as high velocity air over the end bracket 490, thereby keeping the drive end bearings 470 cool. It is to be appreciated that an alternate means for cooling the drive end, such as an external fan, may be used instead of the air deflector 550.

Figure 8:
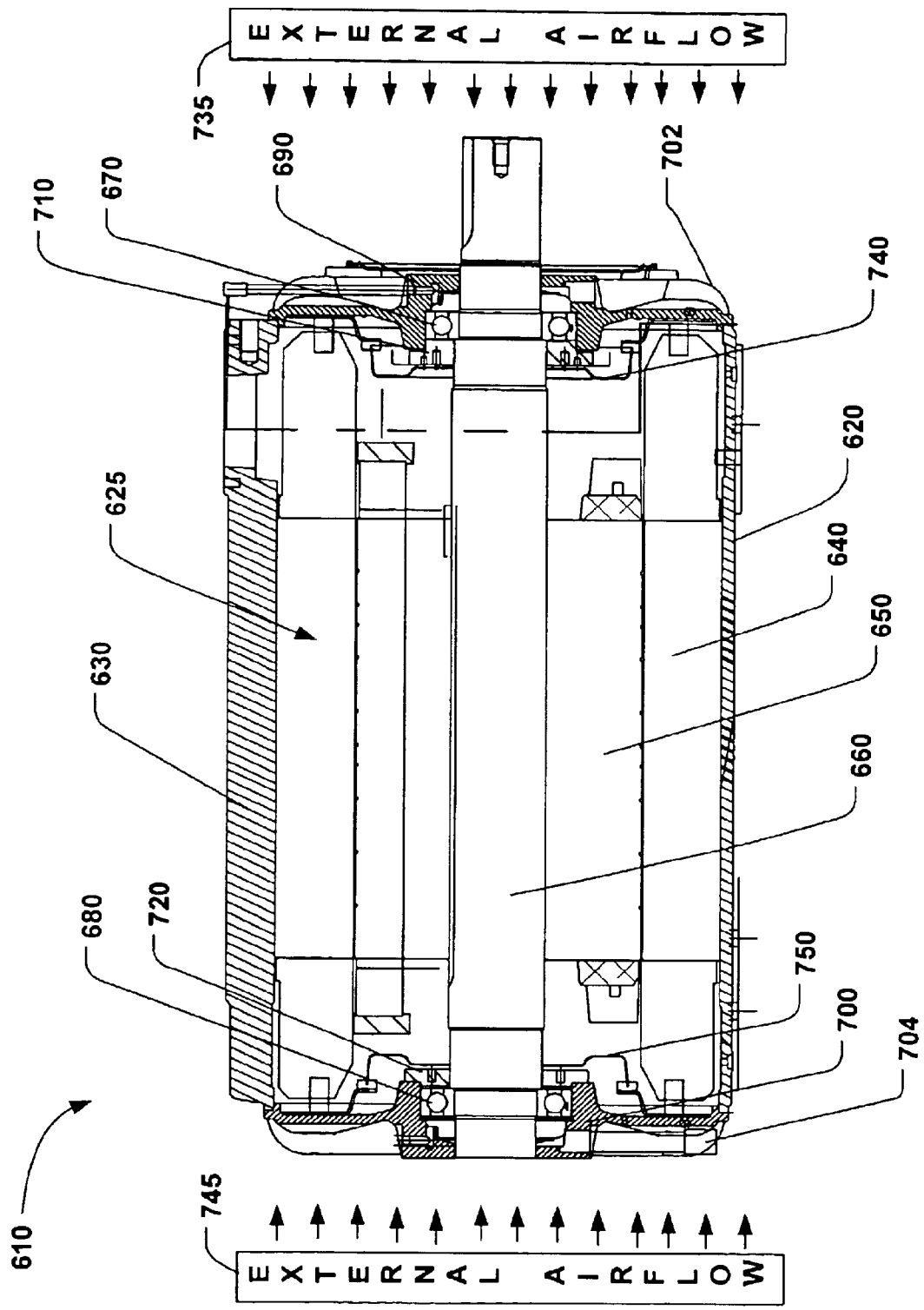
FIG. 8 illustrates a cross-sectional view of a totally enclosed motor employing non-ventilated cooling in accordance with one aspect of the present invention.

FIG. 8 illustrates yet another aspect of the present invention wherein external airflow sources are provided on both the drive side of a totally enclosed motor 610 and the opposite drive side of the totally enclosed motor 610. The totally enclosed motor 610 has a generally cylindrical frame 620 surrounding a motor core 625. The motor core 625 is comprised of a stator 640 and a rotor 650. The rotor 650 is coupled to a shaft 660 extending through a central longitudinal axis of the motor 610. The shaft 660 is supported by a bearing assembly 670 located at a drive end of the motor 610 and a bearing assembly 680 located at an opposite end of the drive end of the motor 610. The frame 620 includes a plurality of radial extending fins 630 substantially covering the frame 620. The bearing assemblies 670 and 680 are generally supported by circular end brackets 690 and 700, and inner caps 710 and 720 coupled to the end brackets 690 and 700, respectively. The circular end brackets may include axially extending fins 702 and 704 similar to the motor fins 630.

The motor 610 includes a thermal barrier 740 disposed inside the motor 610 for insulating the drive side bearing assembly 670 from the heat generated by a motor core 625. The thermal barrier 740 is mounted to the inner cap 710 and adapted to cover a substantial portion of the inner cap 710 and the end bracket 690 that is exposed to the internal air of the motor 610. Since the bearings 670 are encased within the inner cap 710 and the end bracket 690, the thermal barrier 740 acts to insulate the bearings 670 from the heated internal air of the motor 610. The motor 610 can also include a thermal barrier 750 disposed inside the motor 610 for insulating the opposite drive side bearing assembly 680 from the heat generated by a motor core 625. The thermal barrier 750 is provided to ensure that the opposite drive side of the motor 610 remains cool in absence of a fan for providing cooling directly to the opposite drive side of the motor 610. The thermal barrier 750 is mounted to the inner cap 720 and adapted to cover a substantial portion of the inner cap 720 and the end bracket 700 that are exposed to the internal air of the motor 610. Since the bearings 680 are encased within the inner cap 720 and the end bracket 700, the thermal barrier 750 acts to insulate the bearings 680 from the heated internal air of the motor 610.

A first external airflow source 735 is provided at the drive side of the motor 610 and a second external air source 745 is provided at the opposite drive side of the motor 610. The external airflow source 735 and 745 can be any of an external fan or an external blower. Alternatively, both ends of the motor can be cooled by convection, such that the external air sources 735 and 745 are air from the environment surrounding the motor 610. Such an arrangement may realize advantages in an application utilizing free convection cooling, where no external fan is present. However, one may also realize advantages to using a thermal barrier at each end of the motor in combination with one or more fans or blowers.

Figure 9:
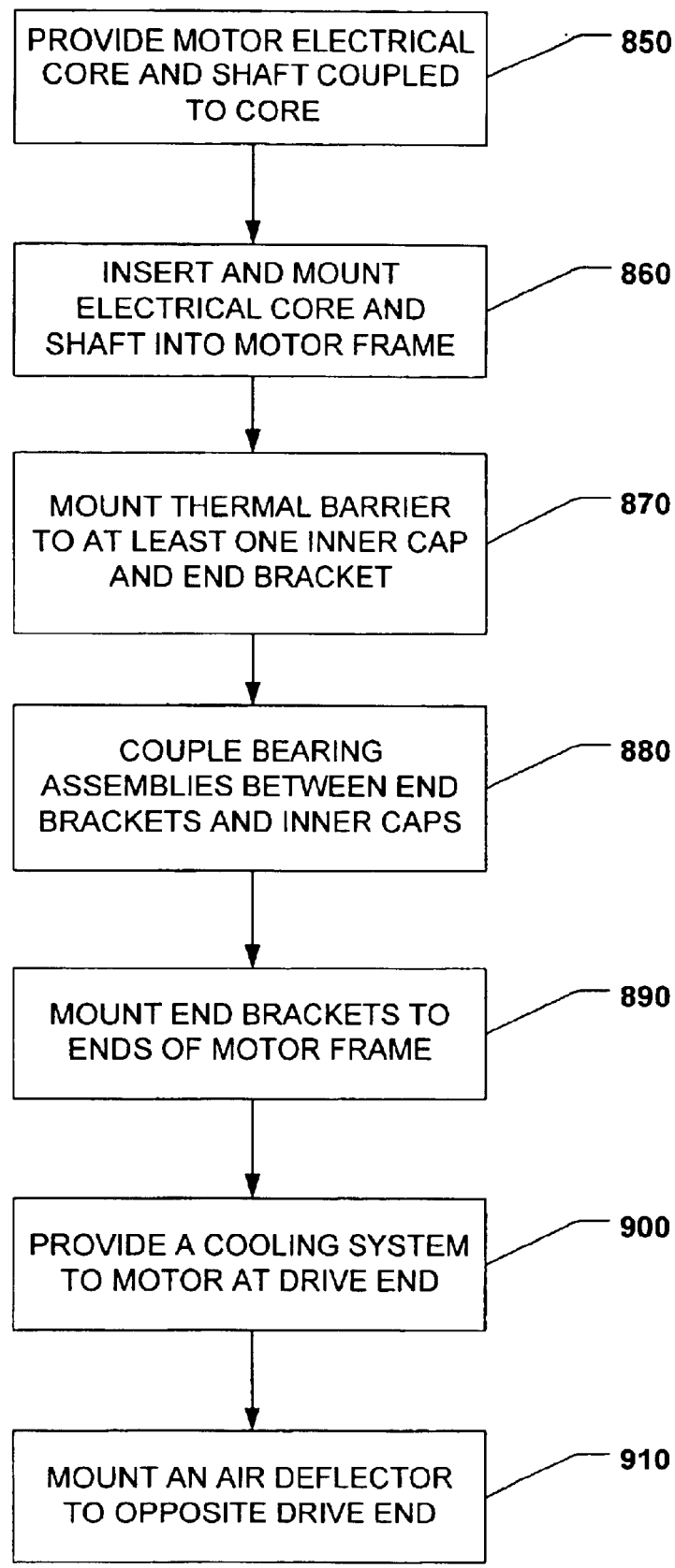
FIG. 9 illustrates a flow diagram of a methodology of manufacturing a totally enclosed motor in accordance with one aspect of the present invention.
Figure 10:
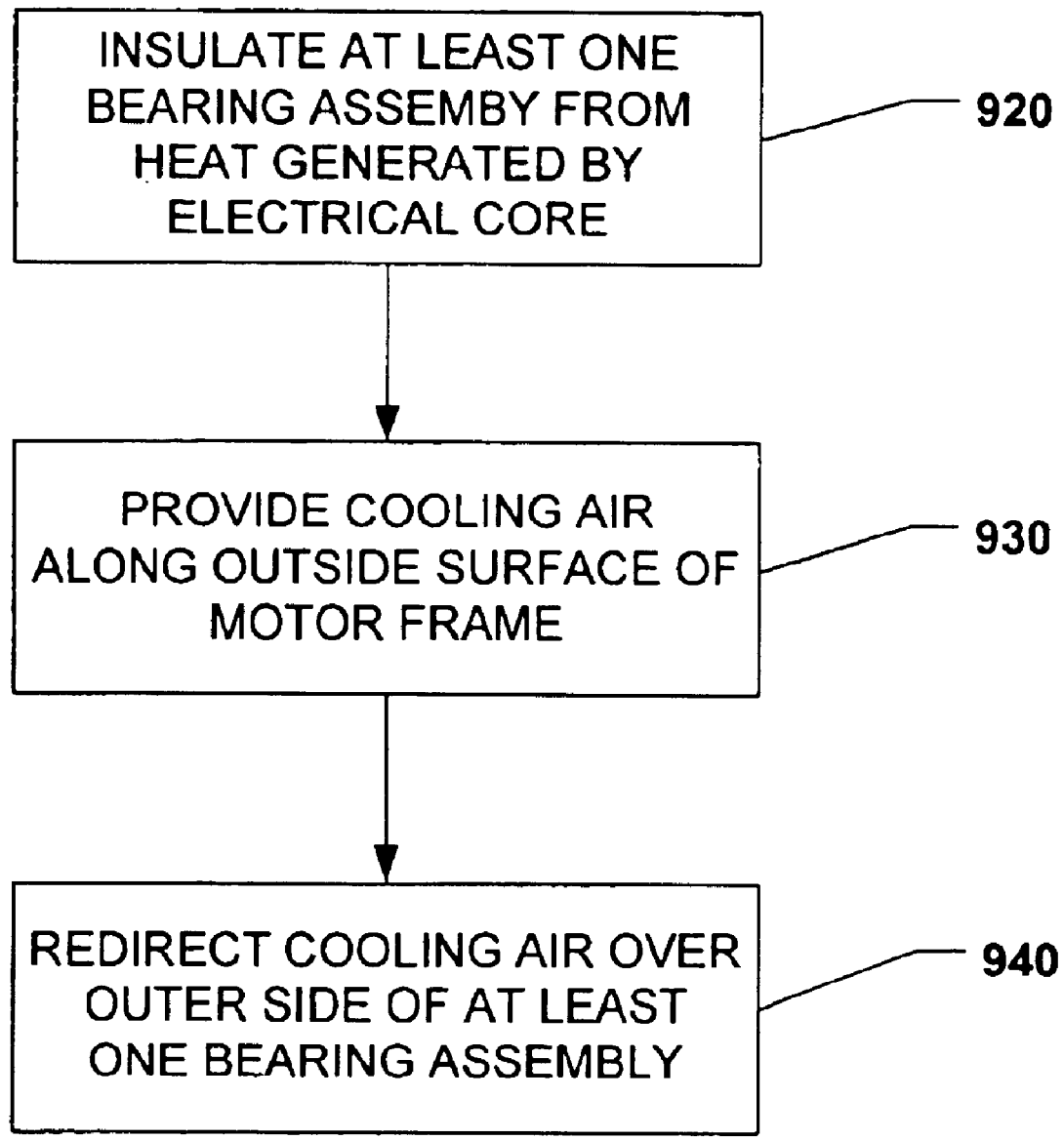
FIG. 10 illustrates a flow diagram of a methodology of cooling a totally enclosed motor in accordance with one aspect of the present invention.

In view of the foregoing structural and functional features described above, two methodologies in accordance with various aspects of the present invention will be better appreciated with reference to FIGS. 9 and 10. While, for purposes of simplicity of explanation, the methodologies of FIGS. 9 and 10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 9 illustrates one particular methodology for fabricating a totally enclosed motor in accordance with an aspect of the present invention. The methodology begins at 850 where a motor electrical core coupled to a shaft is provided. The electrical core includes a stator and a rotor. At 860, the electrical core and shaft are inserted and mounted in a generally cylindrical frame to enclose the motor core and protect it from the environment. At 870, thermal barriers are mounted to at least one of the inner caps and end brackets. At 880, bearing assemblies are disposed between end brackets and inner caps. The end brackets are provided to further enclose the motor from the environment. The methodology then proceeds to 890 where the end brackets are coupled to the motor frame. At 900, a cooling system is provided at the motor opposite drive end to supply the motor with cooling air and dissipate heat produced by the electrical core. At 910, an air deflector is mounted to the opposite drive end of the motor to capture external cooling air and direct it as high velocity air over the end bracket, thereby, cooling the bearings supported within the end bracket.

FIG. 10 illustrates one particular methodology for facilitating cooling of a totally enclosed motor in accordance with an aspect of the present invention. The methodology begins at 920 where a bearing assembly is insulated from heat generated by the motor core. A thermal barrier may be employed to insulate the bearing assembly located at the drive end of the motor, the bearing assembly located at the opposite drive end of the motor, or both bearing assemblies. At 930, cooling air is provided alongside the outside surface of the motor frame. The cooling air may be provided by an external fan, an external blower, or by free convection. At 940, cooling air is redirected over an outer side of one or both of the bearing assemblies, which may be accomplished by an air deflector.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described components (systems, assemblies, systems, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several embodiments, such feature may be combined with one or more other features of the other embodiments, as may be desired and advantageous for any given or particular application. Furthermore, to the extent that the term "includes" is used in either the detailed description or the claims, such term is intended to be inclusive in a manner similar to the term "comprising".

What is claimed is:

1. A system that facilitates cooling of a totally enclosed motor, comprising:
    an electrical core that provides energy to the motor, the electrical core generating heat during normal operation of the motor;
    a motor shaft coupled to the electrical core;
    a frame that surrounds and supports the electrical core;
    a first bearing assembly located at a drive end of the motor to support the motor shaft, the first bearing assembly mounted between an inner cap and an end bracket; and
    a thermal barrier comprising a gasket, the thermal barrier disposed between the core and an inner side of the first bearing assembly to substantially insulate the first bearing assembly from the heat generated by the electrical core.

2. The system of claim 1, further comprising a second thermal barrier disposed between the core and an inner side of a second bearing assembly that is located opposite to the drive end of the motor, the second thermal barrier substantially insulates the second bearing assembly from the heat generated by the electrical core.

3. The system of claim 2, wherein the second thermal barrier comprises a gasket, which gaskets of the first and second thermal barriers are annular.

4. The system of claim 1, wherein the thermal barrier is mounted to an inside surface of the inner cap and the end bracket.

5. The system of claim 1, further comprising an air deflector disposed on an outer side of the first bearing assembly to capture a portion of cooling air forced over an outside surface of the motor from an airflow source, and direct the cooling air over the outer side of the first bearing assembly.

6. The system of claim 5, wherein the airflow source is at least one of an external fan and an external blower.

7. The system of claim 1, wherein the thermal barrier comprises an inner cap thermal barrier and an end bracket thermal barrier either or both of which are formed of one of a metal and a fiberglass.

8. The system of claim 7, wherein the gasket couples the inner cap thermal barrier to the end bracket thermal barrier.

9. The system of claim 7, wherein the gasket accounts for a variation in tolerance between the inner cap thermal barrier and the end bracket thermal barrier.

10. The system of claim 7, wherein the gasket forms an airtight seal between the inner cap thermal barrier and the end bracket thermal barrier.

11. The system of claim 1, wherein the thermal barrier comprises an annular inner cap thermal barrier and an annular end bracket thermal barrier, the annular inner cap thermal barrier is mounted to and substantially surrounds a portion of the first inner cap that is exposed to the internal air of the motor, and the annular end bracket thermal barrier is mounted to and substantially surrounds a portion of the first end bracket that is exposed to the internal air of the motor, so that the first bearing assembly is insulated from the heat generated by the electrical core.

12. A method for cooling a totally enclosed motor, the totally enclosed motor includes an electrical core, the core coupled to a motor shaft, and a frame that encloses the electrical core, the core generates heat during normal operation of the motor, the method comprising:
    providing a first bearing assembly located at a drive end of the motor to support the motor shaft, the first bearing assembly mounted between an inner cap and an end bracket;
    insulating the first bearing assembly from the heat generated by the core using a thermal barrier;
    forcing cooling air along the outside surface of the motor frame; and
    redirecting the cooling air over an outer side of the first bearing assembly.

13. The method of claim 12, further comprising disposing the thermal barrier between the electrical core and an inner side of the first bearing assembly.

14. The method of claim 12, further comprising mounting the thermal barrier on the end bracket and the inner cap, the thermal barrier substantially surrounding the end bracket and the inner cap.

15. The method of claim 12, further comprising,
    providing a second bearing assembly opposite the drive end, the second bearing assembly mounted between a second inner cap and a second end bracket;
    coupling an outer side of the second bearing assembly to the second end bracket and an inner side of the second bearing assembly to the second inner cap; and
    mounting a second thermal barrier having an annular gasket on the second end bracket and the second inner cap to substantially surround the second end bracket and the second inner cap to insulate the second bearing assembly from the heat.

16. The method of claim 12, further comprising mounting the thermal barrier on the end bracket and the inner cap, the thermal barrier comprises an inner cap thermal barrier and an end bracket thermal barrier that are joined using an annular gasket.

17. The method of claim 16, wherein the inner cap thermal barrier mounts on the inner cap and the end bracket thermal barrier mounts on the end bracket.

18. The method of claim 12, further comprising coupling axially extending fins to the end bracket to facilitate cooling of the first bearing assembly.

19. The method of claim 18, wherein the cooling air is redirected across the fins using an air deflector.

20. A system that facilitates cooling a totally enclosed motor, the totally enclosed motor includes an electrical core that is coupled to a motor shaft, and a frame that encloses the electrical core, the core generates heat during normal operation of the motor, the system comprising:

means for providing a first bearing assembly located at a drive end of the motor to support the motor shaft, the first bearing assembly mounted between an inner cap and an end bracket;

means for insulating the first bearing assembly from the heat generated by the core, the means for insulating includes thermal barrier means mounted to the inner cap and the end bracket;

means for forcing cooling air along the outside surface of the motor frame; and means for redirecting the cooling air over an outer side of the first bearing assembly.

* * * * *